Feb. 23, 1937. E. KNAUTH Re. 20,276
BEAUTY APPLIANCE
Original Filed Oct. 7, 1932 2 Sheets-Sheet 1
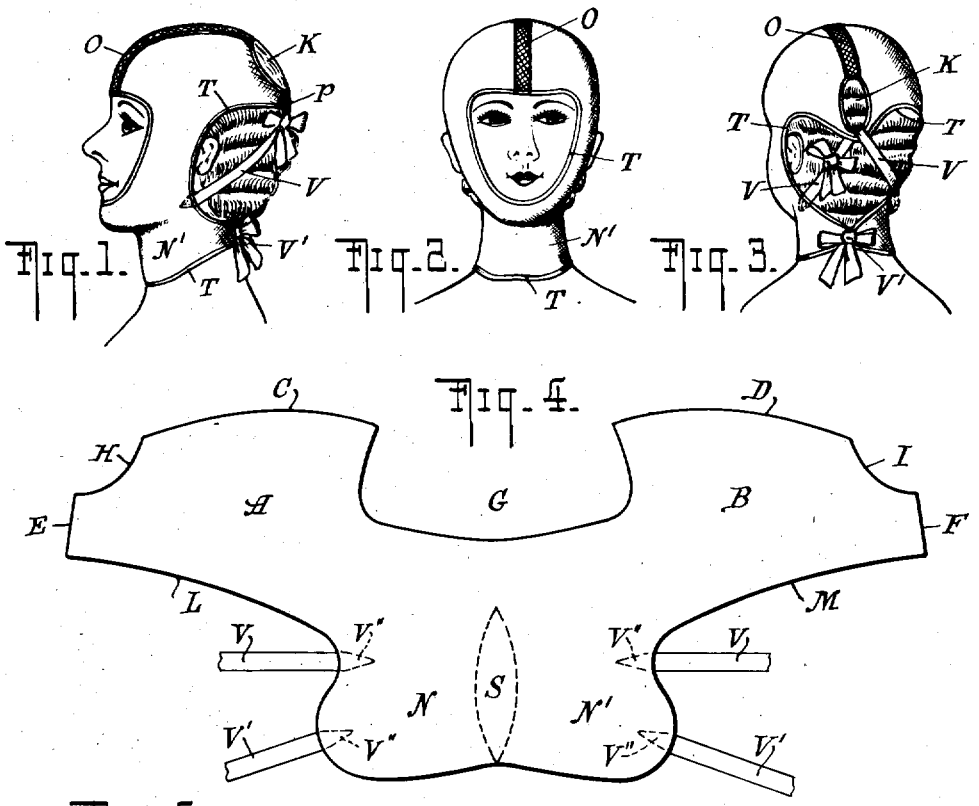
WITNESS
G. V. Rasmussen
INVENTOR
ELSA KNAUTH
BY
Bricsen & Schrenk
ATTORNEYS Feb. 23, 1937.

E. KNAUTH

Re. 20,276

BEAUTY APPLIANCE

Original Filed Oct. 7, 1932

2 Sheets-Sheet 2

WITNESS

G. V. Rasmussen

INVENTOR

ELSA KNAUTH

BY

Briesen & Schreck

ATTORNEYS

Reissued Feb. 23, 1937

Re. 20,276

UNITED STATES PATENT OFFICE 20,276

BEAUTY APPLIANCE

Elsa Knauth, New York, N. Y.

Original No. 1,963,237, dated June 19, 1934, Serial No. 636,696, October 7, 1932. Application for reissue June 11, 1936, Serial No. 84,734

11 Claims. (Cl. 128—164)

The invention relates to a beauty appliance adapted to be associated with the head and parts of the face of the wearer to preserve or to restore to their proper positions the muscles and tissues of the face.

The device consists of a mask-like net fabric of such delicacy of weave and texture that when adjusted properly and with the necessary attention to the proper position of the muscles and tissues, the individual threads constituting the net will nevertheless fail to sink into the skin. The device is of such a character that at those portions thereof where it is in contact with the face it not merely covers the skin but molds the muscles and tissues with relation to the fundamentals of a youthful contour. The device is different in structure and function from such objects as chin straps which merely by compression bear against a certain part of the face without simultaneously establishing a harmonious relation with the other parts of the facial structure. The new device may be compared in its performance with the work of a sculptor engaged in portraying a face as it was at a more youthful period than at the time when the sculptor has the model in sight.

Figure 8:
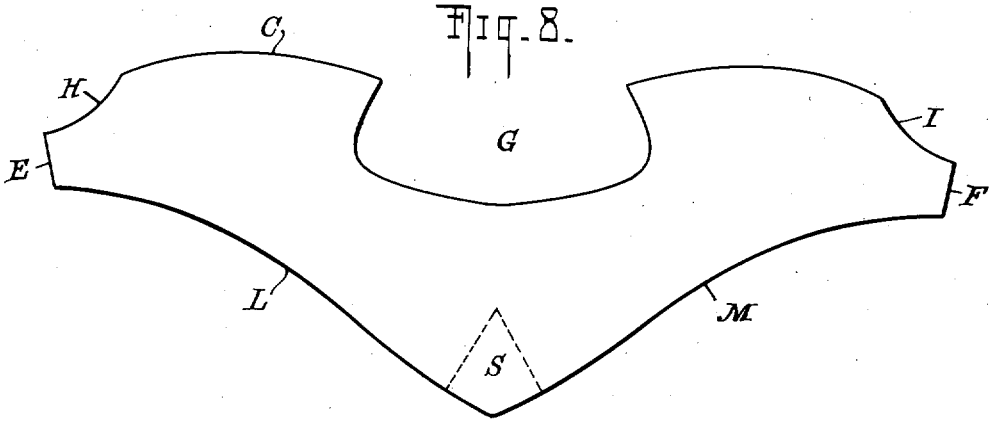
Figure 9:
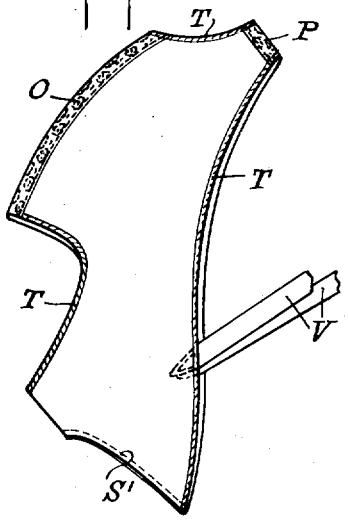
Figure 10:
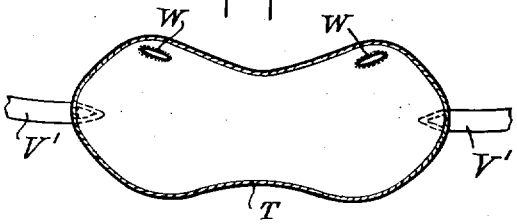

The device of which the invention consists is illustrated in the accompanying drawings in which Fig. 1 is a side view of one form of the appliance in use; Fig. 2 is a front view thereof; and Fig. 3 a rear view; Fig. 4 is a pattern of the net fabric before it is completed into the finished article; Fig. 5 is a side view of the completed finished article disassociated from the wearer; Fig. 6 shows the manner in which certain parts of the structure are united; and Fig. 7 is a sectonal view on line 7—7 of Fig. 5. Fig. 8 illustrates a pattern of the net fabric for the facial section of the appliance when the facial section is made up as an article separate from the neck section; Fig. 9 is a side view of the completed facial section made after the pattern of Fig. 8, disassociated from the wearer; Fig. 10 is a plan view of a modified neck section when such neck section is not made integral with the facial section.

In the drawings Fig. 4 represents a piece of net such as Washblonde or Bretonne net, which are now made on a lever go-through machine, the yarn being a two-ply yarn in the warp and a single yarn in the filling. The preferred netting of the said type is a so-called forty-four hole netting, i. e. netting which has forty-four holes to the square inch counted in the diagonal. Cheaper and finer nets may also be used, the finer nets counting more holes to the square inch, while the cheaper nets count fewer holes to the square inch, the cheaper nets being of a somewhat heavier yarn, while the finer nets are made of a finer yarn, the construction, however, with respect to two-ply in the warp and one ply in the filling remaining the same. Fig. 4 shows a piece of netting of this character cut to the depicted shape. The two halves of this piece of net marked A and B respectively are similar. At the upper central portion of the net it is recessed at G to provide in the completed structure an opening just large enough to leave free the central part of the face between the eyebrows and the lower lip. The two portions of the halves A and B, which in the completed structure form the two lateral facial and head sections, spaced by the central cut-out, cover the sides of the face and the top portion of the head of the wearer and together with the underchin section which connects the lower ends of such facial and head sections form the delimited facial opening shown in Fig. 2. At the edges of Fig. 4 marked H and I, the fabric is cut away to provide two extensions of reduced width projecting from the facial and head sections, the ends of which are united in the completed article to form a loop having an opening K at the back of the head (see Fig. 3). The edges L and M of Fig. 4 are configured in such a way that in the completed article they will form substantially straight lines dipping somewhat as shown at M′ in Fig. 5 at the strapped portion of the head piece. The extensions N, N′ represent the sections which in the finished article lie against the front part of the neck of the wearer.

After the net has been cut to the configuration shown in Fig. 4, its edges C and D are united by sewing and the edges E and F are similarly united. Preferably, both for strength and appearance, these two united sections of the net are covered and reinforced by lace as indicated at O and P in Fig. 5. The manner in which it is done is illustrated in Fig. 7, in which Q is the sewing thread which unites adjacent edges C and D of the net, the free edge portions of the net being then bent back against the body of the net and the lace O placed thereover and sewed down at R and R′. The same type of assembly is used at P.

After assembling the piece of net of Fig. 4 in the manner thus far described, I sew to the edges of G by means of the thread U, in the manner shown in Fig. 6, a cord T formed into a circle with its ends permanently united. This cord is a soft, mercerized, two-ply cotton thread, while the sewing thread used is preferably a thread such as a 3-cord 000 mercerized cotton twist de luxe of the American Thread Co. The cord T supplies rigidity to the edges of the facial opening. In a similar manner, but without first necessarily forming the cord into a permanent ring, I also complete the edges of the opening K along the edges H and I in Fig. 4 and the entire lower edges of the device along the edges L and M of Fig. 4 and along the outside edges of the sections N, N'. After this has been done, I turn in the fabric situated at S in Fig. 4 and run a seam along the line S', Fig. 5, and turn the infolded part S to one side. The infold S may be fastened to the edge of the net by a stitch as at S''. The four ribbons V, V and V', V' are then attached at the two inner sides of the structure at the points indicated as V'' in Fig. 4 and as shown in Fig. 5, the ends of the ribbons V' and V' extend sufficiently into the net portion of the material to prevent the corded edge T from digging into the skin so as to mark it.

The device as it is generally described is in the form of a cap or mask which can be readily placed over the head with the chin part below the chin and the neck part N, N' against the neck. When the device is properly placed in position on the wearer, the facial and head sections of the two halves A and B will lie against the muscles and tissues of the face and the top portion of the head, as shown in Figs. 1 to 3, the cut-outs of the facial and head sections leaving free the central part of the face so that the eyes, nose and mouth of the wearer are uncovered by the device and the two facial and head sections and the under-chin section which connects the lower ends of such facial and head sections forming a delimited facial opening as is shown more clearly in Fig. 2. One of the ribbons V is then drawn through the opening K of the loop formed at the rear portion of the head and tied to the other ribbon with the requisite tension under control of the wearer to cause close fitting of the netting against the face under slight pressure and to place the muscles and tissues of the face and chin under gentle strain. It will be noted that when the appliance is in position as in Fig. 2, the lateral edges of the facial opening are substantially straight, the entire opening being accordingly of a triangular shape. This feature is of importance in that it not only enables the mask to cover a larger part of the face than if the opening were oval, but also because the resultant tension is of the character required for effective functioning of the device.

The ribbons V' are similarly placed under tension and positioned by being tied together, preferably at the back of the neck. The netting, in the facial, chin, and neck sections, whether the same are made all of one piece or in separate pieces, is preferably always on the bias. When the neck piece is made separately, it is cut straight, but the effect of infolding the part S causes a partially diagonal condition to come into existence. The infolded portions S at the chin and neck sections of the device also serve as adjacent means to enable the device to be initially adapted to faces of different sizes by letting out the seams S' and then infolding more or less of the part S and then sewing the seams S' to the thus ascertained position.

The effect of the use of the appliance is cumulative. Its primary purpose is to position the muscles and tissues of the affected parts with respect to an approximation of a more youthful contour. In time, as the muscles and tissues affected become inured to such positions, they will gradually remain in those positions, even when the appliance is not worn. The manner in which the appliance is made and the materials used in its construction are such as not to compel or enforce any substantial distortion of muscles or tissue but merely to position them properly with relation to their previous positions at an earlier period in life, strengthening and supporting them in the maintenance of such more youthful positions. The structure is so light and fine that it does not leave marks after being worn.

In some cases it may be preferred to make the appliance in two pieces. In that case the face portion will be made by the use of a pattern such as shown in Fig. 8, while the neck section is made according to the pattern illustrated in Fig. 10. The two sections shown respectively in Fig. 8 and Fig. 10 can, of course, be sewed together, but in Fig. 10 it is preferred to provide the netting with the apertures W through which, after the face section has been applied, the ribbons V may be threaded before those ribbons are tied together through the opening K at the back of the head. By separating the two sections of the appliance in the manner indicated in Figs. 8 and 10, the wearer can at her option dispense periodically with one or the other of the two parts or constantly use them together whenever the mask is worn.

It is apparent that the details of the structure described may be varied in many particulars without departing from the nature or principles of the invention and it is my intention not to limit the invention to the particular details set forth but rather primarily by reference to said details to set forth one specific method of obtaining the desired end so that, said end, being once realized, may be accomplished by equivalent means within the skill of manufacturers of articles made of the type of materials which are necessary for the accomplishment of the objects of the present invention.

I claim:

1. A device of the character described composed of fine netting and comprising two lateral facial and head sections spaced by a central cut-out and an under-chin section connecting the lower portions of the facial and head sections, two extensions projecting from the facial and head sections, all arranged symmetrically with respect to a central line, said facial and head sections being permanently united along the top of the device to form a delimited facial opening, said extensions being joined together at their ends to form a loop adapted to be seated at the back of the head and extending between the joined-together ends of the extensions and the rear end of the united head sections, and ribbons attached to the said face and head sections extending from the facial sections and adapted to be threaded through the loop at the rear of the head and tied together to cause close fitting of the netting against the face and the under-chin under slight pressure.

2. A device of the character described composed of fine netting and made of a blank comprising two lateral facial and head sections spaced by a central cut-out, two adjoining lateral neck sections, and two extensions projecting from the facial and head sections, all arranged symmetrically with respect to a central line, said facial and head sections being permanently united along the top of the device to form a delimited facial opening, said extensions being joined together at their ends to form an open loop adapted to be seated at the back of the head and extending between the joined-together ends of the extensions and the rear end of the united head sections, and ribbons attached to the netting extending from the facial sections and from the neck sections, respectively, the first set of ribbons being adapted to be threaded through the loop at the rear of the head and tied together, and the second set of ribbons being adapted to be tied together at the back of the neck.

3. A device of the character described comprising two facial and head sections composed of fine netting, an under-chin section connecting the two facial and head sections and two extensions projecting from the facial and head sections, said facial and head sections being permanently united along the top of the device to form with said under-chin section a delimited facial opening, said extensions being joined together at their ends to form a loop adapted to be seated at the back of the head and extending between the joined-together ends of the extensions and the rear of the united head sections, and ribbons attached to the facial and head sections and adapted to be threaded through the loop at the rear of the head and tied together to cause close fitting of the netting against the face under slight pressure.

4. A device of the character described comprising two facial and head sections composed of fine netting, the head portions of said sections being connected together at their upper edges to form a crown portion and the facial portions of said sections extending from such crown portion and adapted to be disposed against the sides of the face, an under-chin section connecting the lower ends of the facial and head sections, said facial and head sections each having a cut-out to leave free the central part of the face and forming with said under-chin section a delimited facial opening, means associated with the head portions of said facial and head sections and extending from the rear end of the united head sections to form a loop at the back of the head and ribbons attached to the lower rear edge portions of said facial and head sections, at least one of said ribbons being adapted to be threaded through the loop at the rear of the head before the free ends of the ribbons are tied together to cause close fitting of the facial portions and the under-chin section against the skin under slight pressure.

5. A device of the character described comprising two lateral facial and head sections composed of fine netting and an under-chin section connecting the lower ends of the facial and head sections, the head portions of said facial and head sections being permanently united along the top of the device to form a crown portion and the facial portions thereof extending from such crown portion and disposed against the sides of the face, said facial and head sections and said under-chin section being shaped to form a delimited facial opening which leaves free the central part of the face between the eyebrows and the lower lip while yet enabling the facial sections to cover the cheeks close to the features, means associated with the head portions of said facial and head sections and extending from the rear end of the united head sections to form a loop at the back of the head and ribbons attached to the lower rear edge portions of said facial and head sections, at least one of said ribbons being adapted to be threaded through the loop at the rear of the head before the free ends of the ribbons are tied together to cause close fitting of the facial portions and the under-chin section against the skin under slight pressure.

6. A device of the character described comprising two lateral facial and head sections composed of fine netting and an under-chin section connecting the lower ends of the facial and head sections, the head portions of said facial and head sections being permanently united along the top of the device to form a crown portion and the facial portions thereof extending from such crown portion and disposed against the sides of the face, said facial and head sections and said under-chin section being shaped to form a delimited facial opening which leaves free the central part of the face between the eyebrows and the lower lip while yet enabling the facial sections to cover the cheeks close to the features, means associated with the head portions of said facial and head sections and extending from the rear end of the united head sections to form a loop at the back of the head and ribbons attached to the lower rear edge portions of said facial and head sections, at least one of said ribbons being adapted to be threaded through the loop at the rear of the head before the free ends of the ribbons are tied together to cause close fitting of the facial portions and the under-chin section against the skin under slight pressure, said facial and head sections and said under-chin section having reinforcing means along the inner edges thereof which form the delimited facial opening for maintaining the contour of said opening under the strains imposed thereon when under tension by the ribbons.

7. In a beauty appliance adapted to be associated with a head and parts of the face of the wearer, the combination of a hair cap of openwork fabric including a crown portion and side portions for disposition against the sides of the head, said hair cap and side portions being shaped to expose the head of the wearer at the back, a portion connecting the lower ends of the side portions and adapted to be disposed beneath the chin of the wearer and forming with said crown and side portions a delimited facial opening to leave free the central portion of the face, and means for securing the hair cap on the head and simultaneously tensioning the portion adapted to be disposed beneath the chin, said means including fastening means connected to the lower rear parts of the side portions and fastening means connected to the rear of the crown portion and disposed at the top of the rear opening formed by said hair cap, said fastening means being adapted to be interengaged to cause a downward tension at the rear of said crown portion and a rearward tension on both sides of the portion adapted to be disposed beneath the chin.

8. In a beauty appliance adapted to be associated with the head and parts of the face of the wearer, the combination of a hair cap of openwork fabric including a crown portion and side portions for disposition against the sides of the head, said hair cap and side portions being shaped to expose the head of the wearer at the back, a portion connecting the lower ends of the side portions and adapted to be disposed beneath the chin of the wearer and forming with said crown and side portions a delimited facial opening to leave free the central part of the face, and means for securing the hair cap on the head and simultaneously tensioning the portion adapted to be disposed beneath the chin, said means including a pair of tie ribbons, each of which is attached at one end to a lower rear part of a side portion and a fastening element disposed at the top of the rear opening formed by said hair cap and connected to the rear of said crown portion, said fastening element forming a loophole through which at least one of the tie ribbons is drawn before the free ends of the tie ribbons are tied together and cooperating with said tie ribbons in the interengaged condition of such elements to cause a downward tension at the rear of said crown portion and a rearward tension on both sides of said portion adapted to be disposed beneath the chin.

9. In a beauty appliance adapted to be associated with the head and parts of the face of the wearer, the combination of a hair cap of openwork fabric including a crown portion and side portions for disposition against the sides of the head, said hair cap and side portions being shaped to expose the head of the wearer at the back, said crown portion having a width greater than said side portions and adapted to cover the top of the wearer's head, a portion connecting the lower ends of the side portions and adapted to be disposed beneath the chin of the wearer and forming with said crown and side portions a delimited facial opening which leaves free the central part of the face between the eyebrows and the lower lip, and means for securing the hair cap on the head and simultaneously tensioning the portion adapted to be disposed beneath the chin, said means including adjustable fastening means connected to the lower rear parts of the side portions and a fastening element of fixed size connected to the rear of the crown portion and disposed at the top of the rear opening formed by said hair cap and side portions, said adjustable fastening means and said fastening element of fixed size being adapted to interengage to cause a downward tension at the rear of said crown portion and a rearward tension on both sides of said under chin portion.

10. In a beauty appliance adapted to be associated with the head and parts of the face of the wearer, the combination of a hair cap of openwork fabric including a crown portion and side portions for disposition against the sides of the head, a portion connecting the lower ends of the side portions and adapted to be disposed beneath the chin of the wearer and forming with said crown and side portions a delimited facial opening adapted to leave free the central part of the face between the eyebrows and the lower lip, and means for securing the hair cap on the head and simultaneously tensioning the portion adapted to be disposed beneath the chin, said means including a pair of spaced tie ribbons each attached at one end to the side of the appliance and a fastening element connected to the rear of the crown portion, said fastening element being disposed nearer the top of the hair cap than said tie ribbons and intermediate the latter and forming a loophole through which at least one of the ribbons is drawn before the other ends of the tie ribbons are tied together, said tie ribbons and fastening element cooperating in their interengaged condition to cause a downward tension at the rear of said crown portion and a rearward tension on both sides of the portion adapted to be disposed beneath the chin.

11. In a beauty appliance adapted to be associated with the head and parts of the face of a wearer, the combination of two facial and head portions composed of open work fabric, said facial portions forming side pieces for disposition against the sides of the face and said head portions having a width greater than that of said side pieces and being connected together at their upper ends to form a crown portion adapted to cover the top of the head, an under-chin portion connecting the lower ends of the side pieces and forming with said facial and head portions a delimited facial opening to leave free the central part of the face and means for securing the crown portion on the head and simultaneously tensioning the under-chin portion, said means including fastening means connected to the lower rear parts of the facial and head portions and fastening means connected to the rear of said crown portion and adapted to be inter-engaged to cause a downward tension at the rear of said crown portion and a rearward tension on both sides of said under-chin portion.

ELSA KNAUTH.